United States Patent Office 2,728,789
Patented Dec. 27, 1955

2,728,789

ACETYLENIC TERTIARY PHOSPHITE ESTERS

Rupert C. Morris, Berkeley, and John L. Van Winkle, San Lorenzo, Calif., assignors to Shell Development Company, Emeryville, Calif., a corporation of Delaware No Drawing. Application November 25, 1952, Serial No. 322,561

4 Claims. (Cl. 260—461)

This invention relates to a new class of organo-phosphorus compounds containing at least one acetylenic triple bond. The compounds of the present invention are new and useful tertiary phosphite esters having each hydrogen atom of phosphorous acid replaced by a different saturated carbon atom containing at least one hydrogen atom linked directly thereto, and which esters contain at least one acetylenic triple bond (—C≡C—), and are preferably free of other atoms than carbon, hydrogen, halogen, phosphorus and oxygen with three times as many oxygen atoms being present as phosphorus and any halogen atoms being linked directly to carbon atoms other than acetylenic carbon atoms and carbon atoms also linked directly to oxygen atoms of the phosphorous acid. A sub-group of compounds of the invention are tertiary phosphite esters represented by the formula

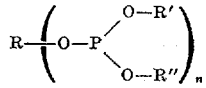

wherein $n$ is a small integer such as 1 to 4, R is a hydrocarbon radical of valence $n$, R' and R" are hydrocarbon radicals of valence up to two with respect to the oxygen atoms, which divalent hydrocarbon radicals have the valent carbon atoms separated by up to one saturated carbon atom so as to constitute part of a ring system of five to six atoms in the ring, which rings are 1,3,2-dioxaphospholane and 1,3,2-dioxaphosphorinane, respectively. At least one of the hydrocarbon radicals contains an acetylenic triple bond, and each of the oxygen atoms linked to phosphorus is also linked directly to different saturated carbon atoms which have at least one hydrogen atom linked directly to each thereof. The compounds thus have the oxygen atoms linked directly to primary or secondary carbon atoms. Furthermore, the compounds represented by the formula have R' and R" each as the same or different monovalent hydrocarbon radicals, or R' and R" are combined together into a single hydrocarbon radical which is divalent when considered with respect to its means of joinder to the two oxygen atoms on the right side of the phosphorus atom of the formula.

The compounds of the invention are readily prepared from phosphorus trichloride. The tertiary phosphites of monohydric acetylenic alcohols are produced by adding one mol of phosphorus trichloride to a solution of three mols of the alcohol in a volatile inert solvent such as ether, petroleum ether, isopentane, benzene or toluene, which solution also contains three mols or slightly more of a tertiary amine as hydrogen chloride acceptor as is pyridine, dimethylaniline, trimethylamine or triethylamine, for example. The phosphorus trichloride is added slowly while keeping the reaction mixture stirred and cooled to below about 15° C. After the addition, the reaction mixture is stirred for some additional time at the low temperature in order to insure completion of the reaction. The formed amine hydrochloride salt is then filtered from the reaction mixture and the desired phosphite is separated by distillation in vacuo of the filtrate.

Compounds of more complex structure are prepared in stepwise fashion from phosphorus trichloride. Thus a dichlorophosphite is first prepared by reacting a mol of phosphorus trichloride with a mol of monohydric alcohol which may or may not contain an acetylenic triple bond. Again solvents and low temperature reaction conditions are employed, but the amine in amount equivalent to the alcohol may be omitted, if desired, since the resulting hydrogen chloride can be boiled from the reaction mixture. The dichlorophosphite is then added to and reacted with another monohydric alcohol with use of two mols of alcohol per mol of dichlorophosphite while having present at least two mols of tertiary amine to combine with the liberated hydrogen chloride. Employment of solvents and low temperature reaction conditions are helpful for best yields of the desired tertiary phosphite ester which is recovered as described above.

The initial preparation of a monochlorophosphite enables production of other complex tertiary phosphite esters. A mol of dichlorophosphite is added to and reacted with a mol of monohydric alcohol in the presence of a mol of tertiary amine to give the monochlorophosphite, the organic radicals linked to oxygen in the dichloro compound and the alcohol being the same or different, and either or both of which contains an acetylenic triple bond. It is again desirable to use inert solvents and low temperature reaction conditions. The resulting monochlorophosphite is then reacted with an alcohol which may be monohydric or polyhydric. The proportion of reactants is chosen so there is one chlorine atom for each alcoholic hydroxyl group. Tertiary amine is present in amount equivalent to monochlorophosphite, and solvents with low temperature reaction conditions are preferably used. The tertiary phosphite is separated from the reaction mixture in usual fashion.

By reacting a mol of phosphorus trichloride with a mol of dihydric alcohol having the carbon atoms of the two carbinol groups separated by up to one saturated carbon atom, there is obtained a monochlorophosphite useful as intermediate for preparation of certain tertiary phosphites of the invention. This monochlorophosphite has a phosphorus atom in a heterocyclic ring of five or six atoms, and is reacted with a monohydric or polyhydric alcohol in the proportion of one mol of the chlorophosphite per equivalent of the alcohol while having present a mol of tertiary amine as acceptor for the liberated hydrogen chloride. The reactions are again effected preferably with use of inert solvents and low temperature reaction conditions.

In producing the compounds of the invention according to the foregoing methods, at least one acetylenic monohydric or polyhydric alcohol is used, the alcohol groups of which are either primary or secondary. In order to substantially eliminate undesired side reactions, substantially or completely anhydrous reaction conditions are used along with low temperature, preferably about —25 to 10° C. The use of trimethylamine as the tertiary amine is preferred since the resultant hydrochloride salt can be filtered from the reaction mixture, and any excess amine along with other reactants and impurities can be removed by distillation in vacuo without necessity of taking the phosphite ester overhead as distillate.

The preparation and properties of several of the varied esters of the invention are described in the following specific examples which are given for the purpose of illustrating, but not limiting, the invention. The parts are by weight.

Example I.—Tripropargyl phosphite

A mixture of 168 parts (3 mols) of propargyl alcohol, 236 parts (4 mols) of trimethylamine, and about 360 parts of diethyl ether was placed in a reaction vessel equipped with a stirrer and cooled to about —5° C. A solution of 138 parts (1 mol) of phosphorus trichloride in about 72 parts of diethyl ether was then added to the mixture during 1½ hours while keeping the reaction mixture stirred and at a temperature between about 0 and 10° C. Upon completion of the addition, the reaction mixture was stirred at about —10 to 0° C. for an additional hour and next filtered to remove the formed trimethylamine hydrochloride. The salt cake was washed with ether and the washing combined with the filtrate. The crude product was then distilled in vacuo to a top temperature of 25° C. at 23 mm. Hg pressure. The tripropargyl phosphite was recovered as residue in amount of 129 parts of clear yellow liquid. Properties and analysis of the ester follow:

| | |
|---|---|
| Specific gravity 20/4 | 1.1445 |
| Refractive index 20/D | 1.4935 |
| Freezing point | below —75° C. |
| Per cent carbon | 55.5 |
| Per cent hydrogen | 5.5 |
| Per cent phosphorus | 12.7 |

Example II.—2-propargyloxy-4-methyl-1,3,2-dioxaphospholane

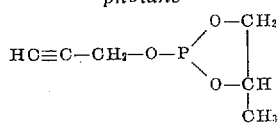

A quantity of 2-chloro-4-methyl-1,3,2-dioxaphospholane was first prepared in the following manner. Two solutions of equal volume were prepared. One contained 360 parts (5 mols) of 1,2-propanediol in about 610 parts of chloroform and the other contained 705 parts (5.1 mols) of phosphorus trichloride in about 510 parts of chloroform. During a period of 2½ hours, the two solutions were allowed to flow at equal rates and mix in the upper end of a tube which was placed at about 15 degrees from the horizontal. The tube emptied into a reaction vessel fitted with a stirrer. At the point of mixing, considerable heating occurred, but further down the tube, the liquid mixture was cooler and entered the reaction vessel at about 13 to 16° C. The reaction mixture was immediately distilled upon completion of the mixing. The desired chlorophosphite, a water-white liquid, was recovered in two fractions, a first fraction of 323 parts distilling at 71 to 76° C. under 50 mm. pressure, and a second fraction of 223 parts distilling at 76 to 82° C. under the same pressure.

The tertiary phosphite ester was prepared by first placing a solution of 50 parts (0.85 mol) of trimethylamine in about 160 parts of isopentane in a reaction vessel fitted with a stirrer and cooling the solution to —10° C. About 80 parts (0.57 mol) of the first fraction of 2-chloro-4-methyl-1,3,2-dioxaphospholane was added next. A solution of 32 parts (0.57 mol) of propargyl alcohol dissolved in about 48 parts of isopentane was then added during 30 minutes while stirring the reaction mixture and keeping it at —15 to —10° C. After the addition, the reaction mixture was stirred for another 2½ hours at —10 to 13° C. and filtered. The filtrate in amount of 244 parts was topped by distillation to a temperature of 22° C. at 55 mm. pressure, and 65 parts of desired product was recovered as residue. The product was a nearly colorless liquid which had the following properties and analysis:

| | |
|---|---|
| Specific gravity 20/4 | 1.2498 |
| Refractive index 20/D | 1.4962 |
| Freezing point | below —75° C. |
| Per cent carbon | 40.8 |
| Per cent hydrogen | 5.7 |
| Per cent phosphorus | 18.9 |

Example III.—1,4[Bis(4-methyl-1,3-dioxa-2-phospholyoxy)]-2-butyne

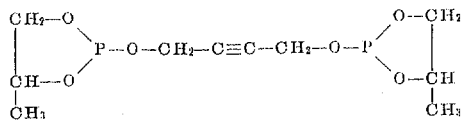

A mixture of 26 parts (0.3 mol) of 2-butyn-1,4-diol and 273 parts (4.62 mols) of trimethylamine were placed in a reaction vessel fitted with a stirrer and cooled to —12° C. A solution of 84 parts (0.6 mol) of the second fraction of 2-chloro-4-methyl-1,3,2-dioxaphospholane described in Example II in about 72 parts of diethyl ether was added during 50 minutes while keeping the reaction mixture at —5 to —12° C. After the addition, the reaction mixture was stirred for another 3 hours at —5 to —10° C. and the salt was filtered out. The salt cake was washed with ether and the washings combined with the filtrate which was then topped by distillation to a temperature of 25° C. at 12 mm. pressure. The desired product in amount of 50 parts was recovered as residue. It was a yellowish liquid having the following properties and analysis:

| | |
|---|---|
| Specific gravity 20/4 | 1.2675 |
| Refractive index 20/D | 1.4957 |
| Freezing point | below —75° C. |
| Per cent carbon | 40.0 |
| Per cent hydrogen | 5.8 |
| Per cent phosphorus | 20.8 |

In similar fashion, the other neutral tertiary phosphite esters of the invention can be prepared. Thus there are included and can be prepared representative, but non-limiting, compounds such as tris(2-butynyl) phosphite, tris(3-butynyl) phosphite, tris(3-butyn-2-yl) phosphite, tris(1-chloro-3-butyn-2-yl) phosphite, tris(2-methyl-4-pentyn-3-yl) phosphite, tris(2,5-heptadiyn-4-yl) phosphite, tris(1,2-dichloro-4-pentyn-3-yl) phosphite, tris(4-bromo-1-penten-4-yn-3-yl) phosphite, tris(1-phenyl-2-butynyl) phosphite, tris(3-phenyl-2-propynyl) phosphite, tris(1-furyl-2-propynyl) phosphite and the like from the respective acetylenic alcohols as well as mixed esters such as 2-butynyl dipropargyl phosphite, 2,5-heptadiyn-4-yl bis(1-chloro-3-butyl-2-yl) phosphite, dibenzyl propargyl phosphite, 2-butynyl 3-butynyl 2-propynyl phosphite, 1,2-bis(dipropargylphospholyloxy) propane, 2-chloro-1,3-bis-[di(3-phenyl-2-propynylphospholyloxy)] butane, tetrabis-(dipropargylphospholyloxymethylene) methane, 2,5-bis-(1,3-dioxa-2-phospholyloxy)-3-hexyne, 1,4-bis(4-ethynyl-1,3-dioxa-2-phospholyloxy)-2-butyne, 2-(2-butynoxy)-1,3,2-dioxaphosphorinane, and the like from appropriate monohydric and/or polyhydric alcohols by the multiple step methods. In accordance with the definition of the compounds of the invention, the tertiary phosphite esters containing one or more acetylenic triple bonds can have any suitable organo groups or combination thereof bonded to the oxygen atoms linked to the phosphorus atom or atoms including hydrocarbon radicals which are aliphatic, alicyclic and/or aromatic with or without the presence of other substituent atoms or chemical groups such as halogen atoms, olefinic groupings, ester groups, ether groups, sulfide groups, etc.

The esters of the invention are useful in a variety of applications. Their unique chemical structure—i. e., the acetylenic linkage in a tertiary phosphite ester, imparts properties of value for use of the compounds as insecticides, fungicides, and like agricultural aids; as resin-forming chemicals for use alone or in combination with other polymerizable compounds to obtain valuable plastic materials; as additives for lubricating oils and greases; as raw materials or intermediates for use in synthesis of a variety of chemical products; and as treating agents in the textile, paper and metal industries.

We claim as our invention:

1. As a new compound, a tertiary phosphite of the formula

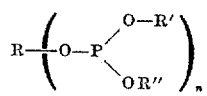

wherein $n$ is an integer of 1 to 2, R is an aliphatic hydrocarbon radical, R' and R" are hydrocarbon radicals which may be joined to form a single hydrocarbon radical and in that case the

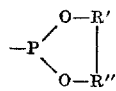

group would be a heterocyclic ring containing from 5 to 6 members in the ring, at least one of the R, R' and R" radicals contain an acetylenic bond but each of these radicals by themselves contain no more than one such acetylenic bond, and each of the oxygen atoms linked to phosphorous being also linked directly to a saturated carbon atom substituted with a hydrogen atom.

2. As a new compound, tripropargyl phosphite.

3. As a new compound, 2-propargyloxy-4-methyl-1,3,2-dioxaphospholane of the formula

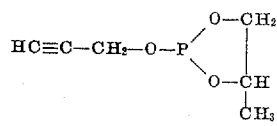

4. As a new compound, 1,4[bis(4-methyl-1,3-dioxa-2-phospholyloxy)]-2-butyne of the formula

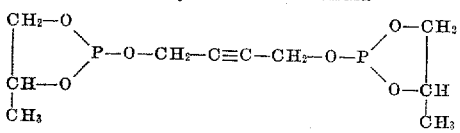

References Cited in the file of this patent

UNITED STATES PATENTS

| | | |
|---|---|---|
| 2,574,516 | Walter | Nov. 13, 1951 |
| 2,589,326 | Oberright | Mar. 18, 1952 |

OTHER REFERENCES

Lucas et al.: Jour. A. C. S., vol. 72, pp. 5491–3 (1950).